(12) United States Patent
Cleary et al.

(10) Patent No.: US 8,347,857 B2
(45) Date of Patent: Jan. 8, 2013

(54) METHOD AND DEVICE FOR IMPROVING CHARGED ENGINES

(75) Inventors: David J. Cleary, Shanghai (CN); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 12/823,112

(22) Filed: Jun. 24, 2010

(65) Prior Publication Data

US 2011/0315101 A1 Dec. 29, 2011

(51) Int. Cl.
*F02D 13/00* (2006.01)
(52) U.S. Cl. ............... 123/347; 123/348; 123/90.15
(58) Field of Classification Search .......... 123/308, 123/310, 432, 491, 90.15, 568.17, 322, 347, 123/348, 345, 346
See application file for complete search history.

(56) References Cited

U.S. PATENT DOCUMENTS

| 4,009,695 | A | * | 3/1977 | Ule | 123/90.13 |
| 5,209,193 | A | * | 5/1993 | Uchida et al. | 123/90.17 |
| 6,742,495 | B2 | * | 6/2004 | Ashida et al. | 123/310 |
| 7,093,568 | B2 | * | 8/2006 | Yang | 123/27 R |
| 7,308,875 | B2 | * | 12/2007 | Murata | 123/90.16 |
| 2003/0196636 | A1 | * | 10/2003 | Ashida et al. | 123/310 |
| 2010/0212617 | A1 | * | 8/2010 | Murata | 123/90.17 |

* cited by examiner

Primary Examiner — John Kwon

(57) ABSTRACT

A charged engine may utilize a plurality of independently controllable intake valves for a cylinder of the engine. A method to operate the engine includes monitoring an unmodified timing for the plurality of independently controllable intake valves for the cylinder, monitoring operation of the engine, determining a delayed timing for a first intake valve of the independently controllable intake valves for the cylinder based upon the monitored operation of the engine and the unmodified timing for the plurality of independently controllable intake valves for the cylinder, controlling the first intake valve based upon the determined delayed timing for the first intake valve, and controlling a second intake valve of the independently controllable intake valves for the cylinder based upon the monitored unmodified timing.

21 Claims, 7 Drawing Sheets

METHOD AND DEVICE FOR IMPROVING CHARGED ENGINES

TECHNICAL FIELD

This disclosure is related to charged internal combustion engines.

BACKGROUND

The statements in this section merely provide background information related to the present disclosure and may not constitute prior art.

Internal combustion engines utilize valve timing strategies to effect changes to engine operation and performance. Valve opening and closing timings influence the thermodynamic cycle and the combustion process, including fuel efficiency, emissions, and engine torque level.

A number of advanced combustion strategies are known, including homogeneous-charge spark ignition, homogeneous-charge compression ignition (HCCI), and stratified charge spark ignition. Such strategies are designed to improve the efficiency and emissions of the internal combustion engine, through a combination of reduced pumping work, reduced heat losses, an improved combustion process, and improved thermodynamics.

Charged engines utilize a compressor device such as a supercharger or a turbocharger to create forced induction of intake air into the engine. Forced induction allows increased engine output under wide-open-throttle (WOT) engine operating conditions.

SUMMARY

A charged engine may utilize a plurality of independently controllable intake valves for a cylinder of the engine. A method to operate the engine includes monitoring an unmodified timing for the plurality of independently controllable intake valves for the cylinder, monitoring operation of the engine, determining a delay timing for a first intake valve of the independently controllable intake valves for the cylinder based upon the monitored operation of the engine and the unmodified timing for the plurality of independently controllable intake valves for the cylinder, controlling the first intake valve based upon the determined delayed timing for the first intake valve, and controlling a second intake valve of the independently controllable intake valves for the cylinder based upon the monitored unmodified timing.

BRIEF DESCRIPTION OF THE DRAWINGS

One or more embodiments will now be described, by way of example, with reference to the accompanying drawings, in which:

FIG. 13 depicts a boost pressure calibration that may be implemented based upon monitored fuel type and quality;

FIG. 14 depicts valve phasing calibrations that may be made based upon monitored fuel type and quality; and FIG. 15 depicts spark advance calibration that may be made based upon monitored fuel type and quality

DETAILED DESCRIPTION

Figure 1:
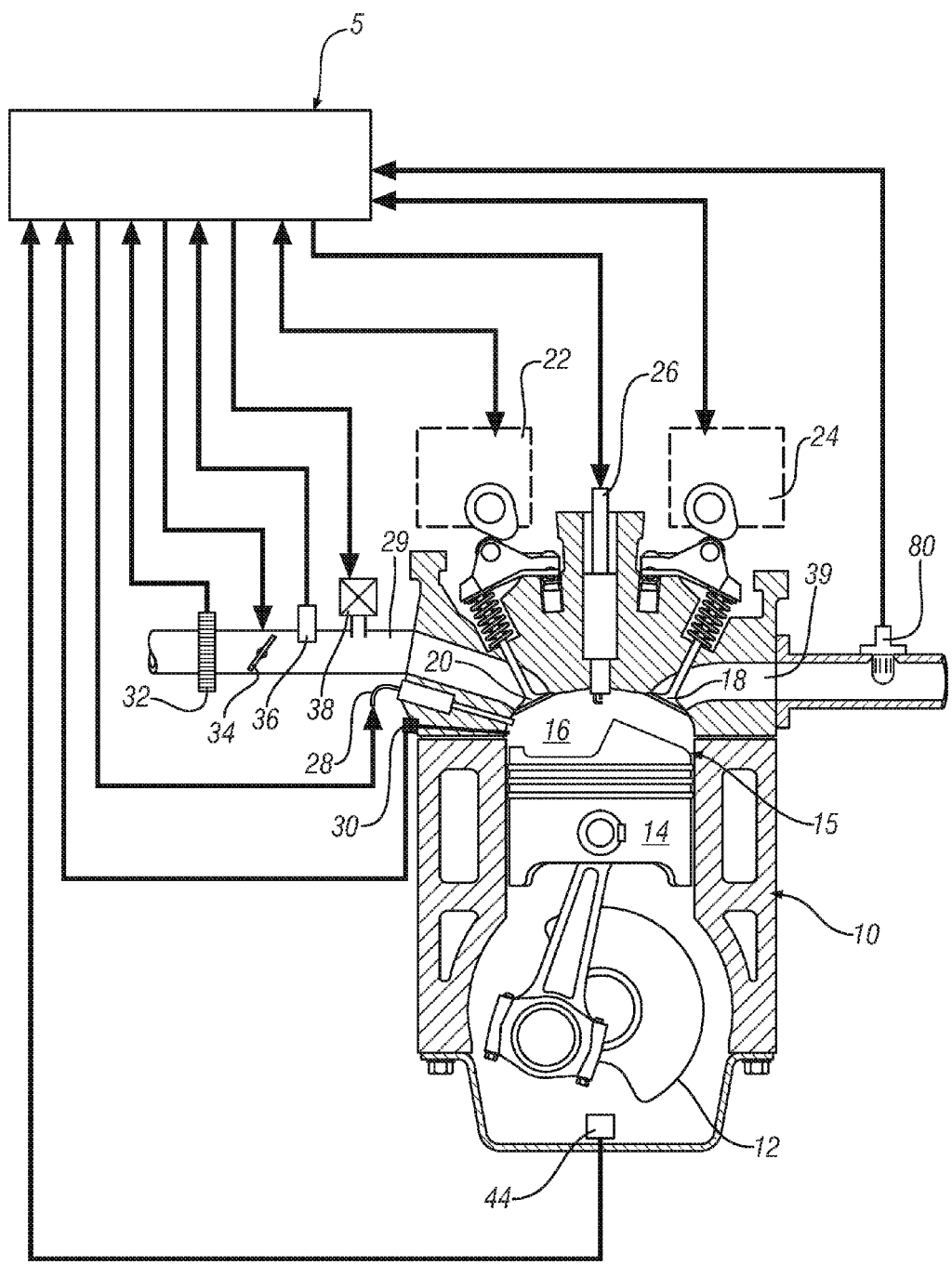
FIG. 1 depicts an exemplary schematic of an internal combustion engine and control module, in accordance with the present disclosure.

Referring now to the drawings, wherein the showings are for the purpose of illustrating certain exemplary embodiments only and not for the purpose of limiting the same, FIG. 1 schematically shows an internal combustion engine 10 and accompanying control module 5. The engine 10 is selectively operative in a controlled auto-ignition combustion mode, a homogeneous spark-ignition combustion mode, and a stratified-charge spark-ignition combustion mode.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal (ETC) from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation (EGR) valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (VLC) devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (VCP), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings to minimize pumping losses. When operating in the HCCI combustion mode, low lift valve openings and negative valve overlap may be commanded to generate reformates in the combustion chamber 16. There may be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 may be controlled. VCP systems may have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap may be measured in crank angle degrees, wherein a positive valve overlap (PVO) refers to a period wherein both the exhaust valve 18 and the intake valve 20 are open and a negative valve overlap (NVO) refers to a period between closing of the exhaust valve 18 and subsequent opening of the intake valve 20 wherein both the intake valve 20 and the exhaust valve 18 are closed. When operating in the HCCI combustion mode, the intake and exhaust valves may have a NVO as part of an exhaust recompression strategy. In a SI-homogeneous combustion mode the intake and exhaust valves may have a NVO, but more typically will have a PVO.

The engine 10 includes a fuel injection system, comprising a plurality of high-pressure fuel injectors 28 each adapted to directly inject a mass of fuel into one of the combustion chambers 16, in response to a signal (INJ_PW) from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal (IGN) from the control module 5. The spark plug 26 may enhance the ignition process of the engine at certain conditions such as for the HCCI combustion mode (e.g., during cold engine conditions and near a low load operation limit).

The engine 10 is equipped with various sensing devices for monitoring engine operation, including monitoring crankshaft rotational position, i.e., crank angle and speed. Sensing devices include a crankshaft rotational speed sensor (crank sensor) 44, a combustion sensor 30 adapted to monitor combustion and an exhaust gas sensor 80 adapted to monitor exhaust gases, for example using an air/fuel ratio sensor. The combustion sensor 30 comprises a sensor device operative to monitor a state of a combustion parameter and is depicted as a cylinder pressure sensor operative to monitor in-cylinder combustion pressure. The outputs of the combustion sensor 30, the exhaust gas sensor 80 and the crank sensor 44 are monitored by the control module 5 which determines combustion phasing, i.e., timing of combustion pressure relative to the crank angle of the crankshaft 12 for each cylinder 15 for each combustion cycle. The combustion sensor 30 may also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and lower ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used.

The control module 5 is an element of an overall vehicle control system, preferably comprising a distributed control module architecture operable to provide coordinated system control. The control module 5 is operable to synthesize pertinent information and inputs from the aforementioned sensing devices, and execute algorithms to control various actuators to achieve control of fuel economy, emissions, performance, drivability, and protection of hardware, as described hereinbelow.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
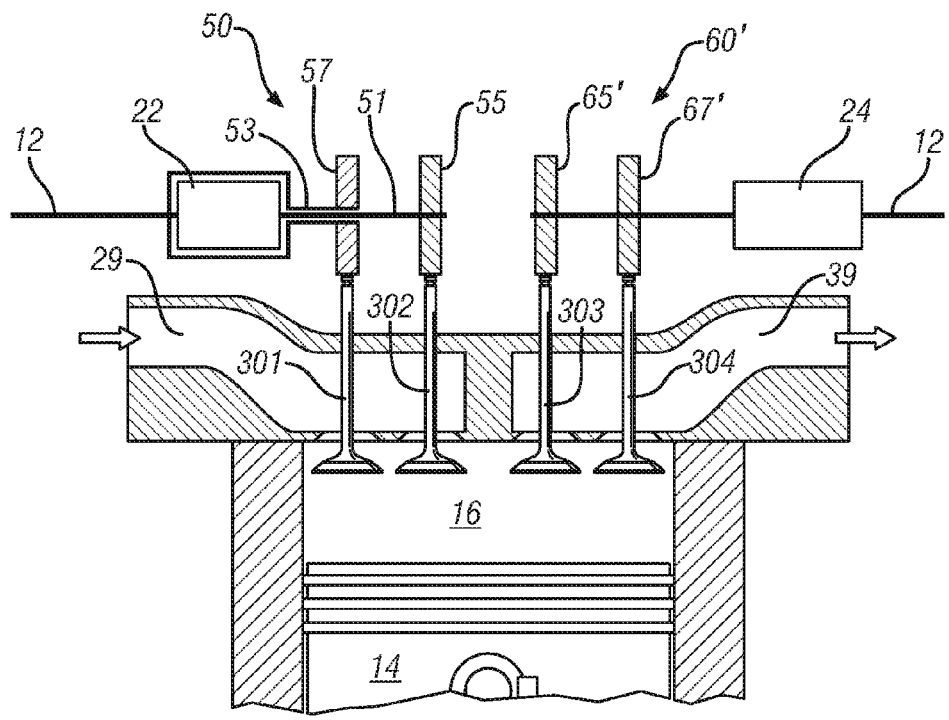
FIG. 2 schematically depicts an exemplary single cylinder of a dual overhead camshaft internal combustion engine, in accordance with the present disclosure.

Referring now to the schematic illustration of FIG. 2, a single cylinder of a dual overhead camshaft internal combustion engine constructed in accordance with exemplary embodiments of the invention is illustrated. Other cylinders of the engine are similarly configured as described. Air flow from the engine intake into each combustion chamber is controlled in the present embodiment by two or more intake valves, minimally illustrated for simplicity with two intake valves 301 and 302. However, more than two intake valves may be employed in other embodiments. Flow of combusted gases from each combustion chamber to an exhaust system is controlled in the present embodiment by two or more exhaust valves, minimally illustrated for simplicity with two exhaust valves 304 and 303. However, more than two exhaust valves may be employed in other embodiments.

In the exemplary embodiment of FIG. 2, the left portions of the figures correspond to exemplary intake valvetrains whereas the right portion of the figures correspond to exemplary exhaust valvetrains. Openings and closings of first and second intake valve 301 and 302 are controlled by respective first and second intake cams. Similarly, openings and closings of first and second exhaust valves 304 and 303 are controlled by respective first and second exhaust cams. Thus, in the exemplary dual overhead camshaft engine, there are first and second intake valves for each cylinder and corresponding first and second intake cams for each cylinder. All of the intake cams reside on a single intake camshaft for each bank of cylinders. Similarly, there are first and second exhaust valves for each cylinder and corresponding first and second exhaust cams for each cylinder. All of the exhaust cams reside on a single exhaust camshaft for each bank of cylinders.

In accordance with this disclosure, a dual overhead camshaft internal combustion engine includes an intake camshaft carrying intake cam lobes, and an exhaust camshaft carrying exhaust cam lobes. At least one of the intake and exhaust camshafts is a dual-concentric camshaft including an inner shaft and an outer shaft. Inner and outer shafts are configured concentrically and capable, within limits, of relative rotation. A first cam lobe is fixedly attached to the outer shaft and a second cam lobe is fixedly attached to the inner shaft.

In accordance with this disclosure, a VCP system is operatively coupled to the dual-concentric camshaft. The VCP system may be operatively coupled to one or both of the inner and outer shafts of the dual-concentric camshaft. A VCP system coupled to one of the inner and outer shafts includes a single-phase adjuster configured to adjust the phase relationship of the respective coupled inner or outer shaft in relation to the engine crankshaft 12. A VCP system coupled to both the inner and outer shafts includes respective first and second phase adjusters configured such that one of the phase adjusters adjusts the phase relationship of the outer shaft in relation to the engine crankshaft 12, and the other phase adjuster is adjusts the phase relationship of the inner shaft in relation to the engine crankshaft 12. Intervening drive mechanisms such as gears, pulleys, belts, chains and the like may be located to transmit crankshaft rotation to the camshaft, including via the VCP system as the case may be to effect camshaft rotation in accordance with phase adjustments made by the VCP system. In a preferred embodiment, a single cam timing belt provides the rotative drive coupling between the engine crankshaft 12 and all of the engine camshafts. The VCP system is controlled by the control module. Cam position sensors preferably monitor rotational position of each of the inner and outer shafts with respect to the engine crankshaft and provide control feedback to the control module. Thus individual inner and outer shaft phases relative to the crankshaft are determined (i.e. absolute phase) from which relative inner and outer shaft phase (i.e. relative phase) may readily be derived. The range of phasing authority is defined and limited by the hardware of the VCP system and the control system which actuates the VCP system. The VCP systems may be actuated using one of electro-hydraulic, hydraulic, and electric control force, controlled by the control module.

In the exemplary embodiment of FIG. 2, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Single-phase adjuster intake VCP system 22 is operatively coupled to the inner shafts 51 of dual-concentric intake camshaft 50 and includes a phase adjuster. The phase adjuster is configured to adjust the phase relationship of the inner shaft 51 in relation to the engine crankshaft 12. One having ordinary skill in the art will appreciate that while the presently described and illustrated embodiment wherein the one of the inner and outer shafts that is phase adjustable is the inner shaft 51, alternative phase adjustment of the outer shaft 53 is a substantially equivalent arrangement. The exhaust valvetrain includes single-shaft exhaust camshaft 60' with first and second exhaust cam lobes 67', 65' fixedly attached thereto such that first and second exhaust cam lobes 67', 65' are in a fixed relative phase with each other. Exhaust VCP system 24 is operatively coupled to the single-shaft exhaust camshaft 60' and includes a phase adjuster. The phase adjuster is configured to adjust the phase relationship of the single-shaft exhaust camshaft 60' in relation to the engine crankshaft 12.

Figure 3:
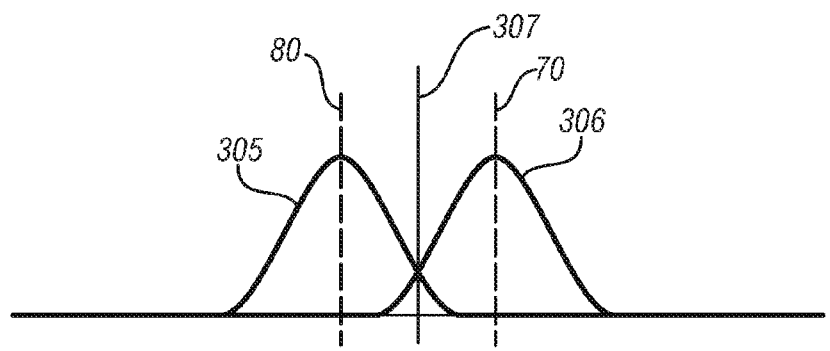
FIGS. 3 and 4 graphically depict methods of continuously variable differential phasing of intake valve operation in accordance with the present disclosure.
Figure 4:
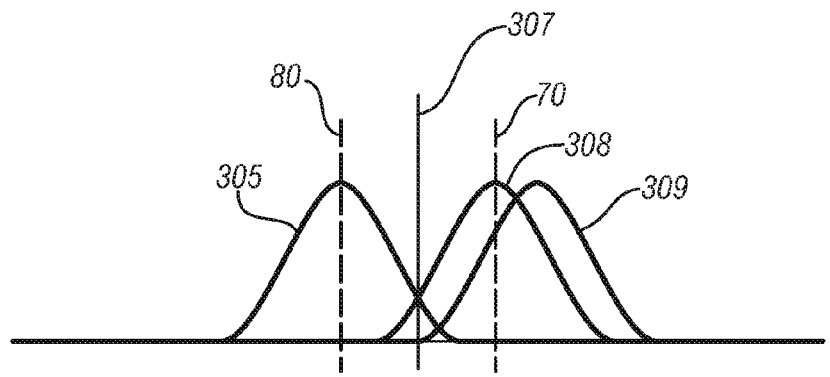

FIGS. 3 and 4 graphically depict methods of continuously variable differential phasing of intake valve operation in accordance with the present disclosure. Both figures include an x-axis depicting crank angle degrees (CAD) and a y-axis depicting valve lift. FIGS. 3 and 4 illustrate top dead center (TDC) 307 piston travel between exhaust and intake strokes in an exemplary engine. FIGS. 3 and 4 illustrate a nominal intake valve phase metric 70 relative to peak intake valve opening and a nominal exhaust valve phase metric 80 relative to peak exhaust valve opening. FIG. 3 depicts intake valve lift profiles 306 and exhaust valve lift profiles 305, illustrated relative to CAD. The intake and exhaust valve profiles illustrated in FIG. 3 may be referred to as nominal profiles and one having ordinary skill in the art would understand such profiles to be substantially consistent with a conventional internal combustion engine operation having a nominal positive valve overlap at top dead center.

FIG. 4 illustrates phase control of the second intake valve in a manner which retards the valve profile IV2 from nominal, thereby resulting in a reduction in the effective compression ratio of the engine as described in further detail herein. A first intake valve lift profile (IV1) 308, second intake valve lift profile (IV2) 309, and first exhaust valve lift profile (EV1) and second exhaust valve lift profile (EV2) 305 are illustrated relative to CAD. The illustrated control of FIG. 4 may be effected through a second intake cam being configured for phase control independently from a first intake cam. One skilled in the art will appreciate that such a configuration may also be utilized to advance the valve profile IV2 from nominal to effect an increase in internal exhaust gas recirculation as described in further detail herein.

FIG. 1 depicts an exemplary configuration of engine 10 including a naturally aspirated engine, wherein intake air is drawn into the engine from an ambient pressure environment. Methods are known to provide boost air to the engine. Exemplary methods to provide boost air include turbocharging, wherein a turbine in the exhaust system is utilized to drive a compressor in the intake system; twin turbocharging, wherein multiple turbochargers are utilized; supercharging, wherein a belt driven device includes a compressor in the intake system; and a combination of turbocharging and supercharging, wherein both methods are utilized to cooperatively provide boost air in the intake system.

Figure 5:
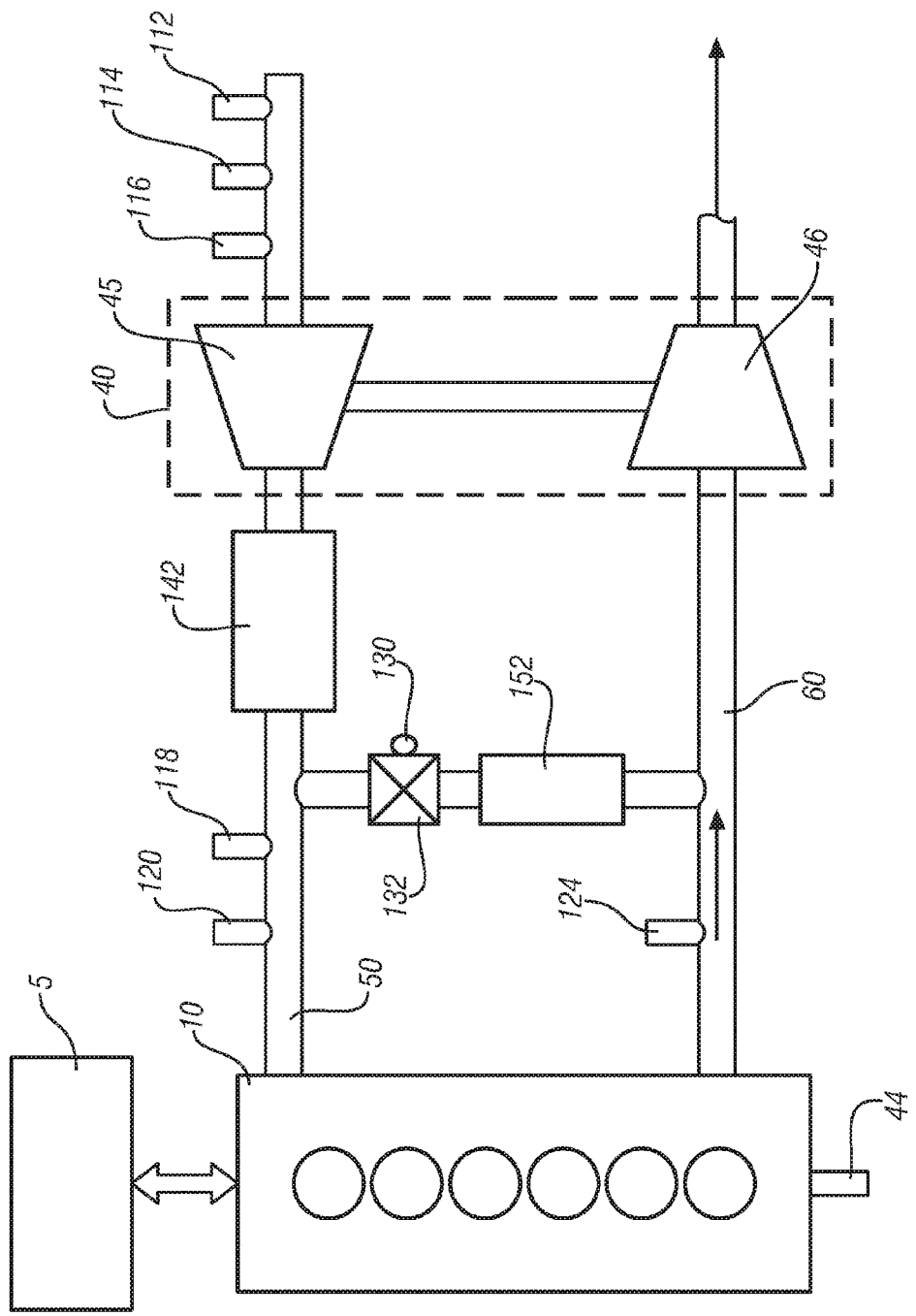
FIG. 5 schematically depicts an exemplary engine configuration including a turbocharger, in accordance with the present disclosure.

FIG. 5 schematically depicts an exemplary engine configuration including a turbocharger, in accordance with the present disclosure. The exemplary engine 10 comprises a conventional multi-cylinder internal combustion engine 10, as described above. Engine 10 may include a variety of fueling types and combustion strategies known in the art. Engine system components include an intake air compressing device 40 comprising a turbine device (TURB) 46 and an air compressor device (COMP) 45, a charge air cooler 142, an EGR valve 132 and cooler 152, an intake manifold 50, and exhaust manifold 60. Sensing devices are installed on the engine to monitor physical characteristics and generate signals which are correlatable to engine and ambient parameters. The sensing devices preferably comprise an ambient air pressure sensor 112, an ambient or intake air temperature sensor 114, and a mass air flow sensor 116, all which may be configured individually or as a single integrated device; an intake manifold air temperature sensor 118, and MAP sensor 120. There is an exhaust gas temperature sensor 124 and an EGR valve position sensor 130. Engine speed sensor 44 monitors rotational speed of the engine. Each of the sensing devices is signally connected to the control module 5 to provide signal information which is transformed by the control module 5 to information representative of the respective monitored parameter. It is understood that this configuration is illustrative, not restrictive, including the various sensing devices being replaceable within functionally equivalent devices and algorithms and still fall within the scope of the invention. Furthermore, the intake air compressing device 40 may include alternative turbocharger configurations within the scope of this disclosure.

The exemplary embodiment of FIG. 5 depicts an exemplary configuration including a high-pressure EGR system, wherein flow through EGR valve 132 and cooler 152 is taken from the exhaust system before the turbine 46 and the EGR flow enters the intake system after the compressor 45. It will be appreciated that in different exemplary configurations, a low-pressure EGR system may be utilized, wherein the EGR flow is taken from the exhaust system after the turbine 46 and enters the intake system before the compressor 45.

The intake air compressing device 40 comprises a turbocharger device consisting of an air compressor device 45 positioned in the air intake of the engine which is driven by turbine device 46 that is positioned in the exhaust gas flowstream. Turbochargers are devices known in the art to create forced induction of air into an engine to increase the output of the engine. Turbine device 46 may include a number of embodiments, including a device with fixed vane orientations or variable vane orientations. Further, a turbocharger may be used as a single device, or multiple turbochargers may be used to supply boost air to the same engine.

Figure 6:
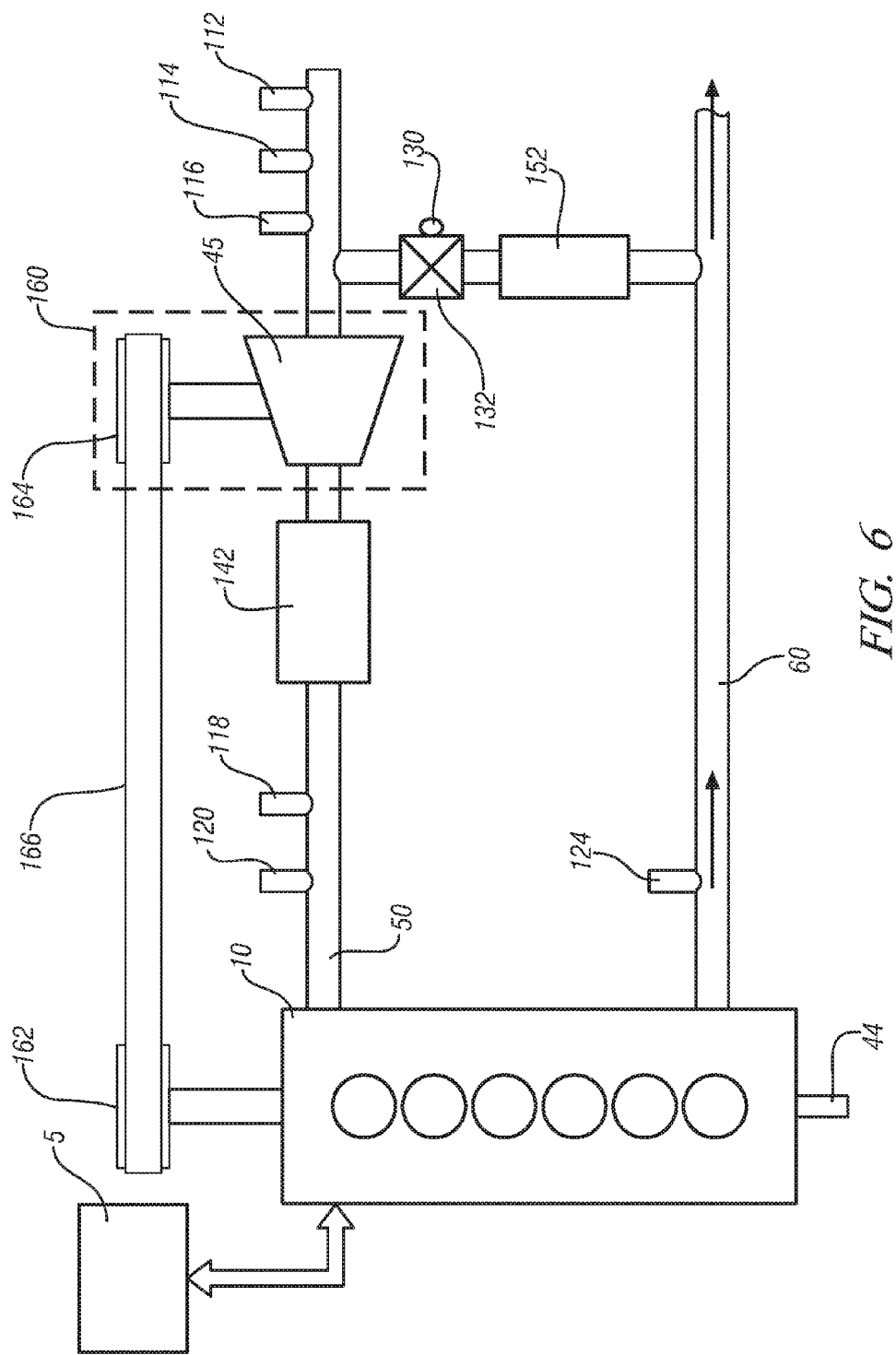
FIG. 6 schematically depicts an exemplary engine configuration including a supercharger, in accordance with the present disclosure.

FIG. 6 schematically depicts an exemplary engine configuration including a supercharger, in accordance with the present disclosure. The exemplary engine 10 comprises a conventional multi-cylinder internal combustion engine 10, as described above. Engine system components include a supercharger device 160 comprising an air compressor device 45 and a belt driven wheel 164, a charge air cooler 142, an EGR valve 132 and cooler 152, an intake manifold 50, and exhaust manifold 60. Engine 10 includes driven wheel 162, providing power to belt 166 driving belt driven wheel 164. An exemplary belt 166 may include a configuration known in the art as a serpentine belt. Exemplary configurations include belt 166 driving the supercharger device 160 and other accessory devices such as an alternator or an air conditioning compressor simultaneously. Sensing devices are installed on the engine to monitor physical characteristics and generate signals which are correlatable to engine and ambient parameters. The sensing devices preferably comprise an ambient air pressure sensor 112, an ambient or intake air temperature sensor 114, and a mass air flow sensor 116, all which may be configured individually or as a single integrated device; an intake manifold air temperature sensor 118, and MAP sensor 120. There is an exhaust gas temperature sensor 124 and an EGR valve position sensor 130. Exemplary EGR valve 130 and EGR cooler 152 provide a path for EGR flow to enter the intake system upstream of the supercharger device 160. Under other configurations, the EGR flow may enter the intake system downstream of the supercharger device 160, although it will be appreciated that high pressure downstream of the supercharger may limit conditions in which the EGR flow will effectively enter the intake under this configuration. Engine speed sensor 44 monitors rotational speed of the engine. Each of the sensing devices is signally connected to the control module 5 to provide signal information which is transformed by the control module 5 to information representative of the respective monitored parameter. It is understood that this configuration is illustrative, not restrictive, including the various sensing devices being replaceable within functionally equivalent devices and algorithms and still fall within the scope of the invention. Supercharger device 160 may be used to provide boost air to an engine, or supercharger device 160 may be used in cooperation with a turbocharger device to provide boost air to an engine.

The control module 5 is an element of an overall vehicle control system, preferably comprising a distributed control module architecture operable to provide coordinated system control. The control module 5 is operable to synthesize pertinent information and inputs from the aforementioned sensing devices, and execute algorithms to control various actuators to achieve control targets, including such parameters as fuel economy, emissions, performance, drivability, and protection of hardware, as described herein below.

The naturally aspirated, direct injection engine 10 of FIG. 1 is known to include a number of methods to improve fuel efficiency, including operation under homogeneous-charge spark ignition (HCSI), HCCI, stratified charge, or PCCI strategies in exemplary diesel configurations. Operation of such strategies require dynamic changes to intake air charge into the engine, including control of residual gas levels within the cylinder and control of an effective compression ratio for the cylinder. A geometric compression ratio describes a volume of the cylinder with the piston at bottom dead center as compared to a volume of the cylinder with the piston at top dead center and is a measure of the compression of the combustion charge achieved under fixed conditions. While the cylinder head and cylinder walls are immovable structures that do not dynamically change shape, an effective compression ratio may be described and modulated, whereby valve opening and closing events may be adjusted, such that the air drawn into the cylinder through the combustion cycle is modulated to an effect of changing how much air is compressed in the cylinder during the combustion cycle.

Residual gas levels within the cylinder are known to be modulated through adjusting valve timing. Valve overlap is a term of art that describes retarding the closing of the exhaust valve after top dead center and/or advancing opening of the intake valve before top dead center in order to change an amount of residual gas within the cylinder during the subsequent combustion event. Residual gas within the cylinder changes the properties of the trapped mass within the combustion chamber which may strongly influence the combustion process.

Some embodiments of turbocharged engines are designed at a single geometric compression ratio, which limits fuel economy and wide-open throttle performance, especially when considering alternative fueled powertrains. As the engine is required to operate at high torque levels, the designed geometric compression ratio is typically reduced compared to the naturally aspirated counterpart; resulting in reported fuel consumption penalties up to 6%. This reduction in geometric compression ratio is required for such an engine to operate at high loads with acceptable knock performance and to manage other combustion issues such as pre-ignition that result when peak combustion temperatures within the cylinder get too high. Lowering the geometric compression ratio lowers the peak combustion temperature. In order to maintain a desired maximum peak combustion temperature in an engine with a fixed geometric compression ratio, a relatively low geometric compression ratio must be selected to achieve acceptable high-load combustion performance. This reduction in the geometric compression ratio also limits the potential of introducing other engine technologies for turbocharged engines, such as HCCI or stratified charge combustion. Assuming the turbocharged engine was designed at a higher geometric compression ratio, better fuel economy would be obtained; however, performance of the engine at wide-open-throttle (WOT) conditions would deteriorate significantly and to unacceptable levels, for example, resulting in engine knock and poor combustion stability. When introducing alternative fuels, the single geometric compression ratio design is further limiting as engines operating with fuels such as E85 could be designed at a higher geometric compression ratio, but are typically designed at a lower geometric compression ratio to manage the usage of more conventional and lower octane gasoline fuels in the same engine.

A method to change the effective compression ratio in a turbocharged engine may be described as a Miller cycle in which the timing of the intake valves are altered to change how much charge is contained within the cylinder and compressed during a compression stroke. By retarding the closing of the intake valve at the end of the intake stroke past bottom dead center, some of the charge air may be pushed by the action of the piston back into the intake manifold, thereby reducing the volume of air trapped and compressed by the piston after the intake valve closes. While adjusting the closing of the intake valve or late-intake-valve-closing (LIVC) may be used to lower the effective compression ratio, it remains important to deliver to the combustion chamber a required quantity of air to support the combustion event. Boost air control may be used to control a mass of air trapped and compressed by the cylinder utilizing LIVC. Control of pressure within the manifold, for example, by controlling boost pressure applied by the turbocharger is important to controlling engine performance while operating under the Miller cycle.

Control of intake valve opening and closing events may be controlled by advancing or retarding cam timings. The Miller cycle described above may be controlled by retarding the cam controlling the intake valves, thereby retarding the closing of the intake valves. Similarly, in order to effect valve overlap for control of the internal residual gas levels, intake valve timing may be advanced by advancing the cam timing. However, it will be appreciated that the same cam timing cannot be simultaneously advanced and retarded. Unitary control of intake valves for a cylinder by modulating a cam timing may affect an advance in the opening of the intake valve or retard a closing of the intake valve, but not both simultaneously.

Modulation of effective compression ratio may be used to optimally operate the engine, for example, achieving high output efficiency in the engine with a high effective compression ratio when engine operation allows. For example, an engine may be operated at a high effective compression ratio in normal operation and at a lower effective compression ratio under WOT conditions. In another example, the type of fuel being utilized to operate the engine may be determined and the effective compression ratio may be modulated based upon the use of alternative fuels. In one exemplary embodiment, the engine may be configured to a high geometric compression ratio and valve timing may be changed to permit modulation of the effective compression ratio when a lower compression ratio is required based upon both engine calibration and sensed fuel quality.

Turbocharged engines may be designed as SIDI engines with dual-independent-cam-phasing (DICP). This combination provides the possibility of varying effects of the valve timings of each of the intake valves. Such control of the intake valves may take a number of embodiments, including a splayed-cam method, wherein one intake-valve is delayed relative to the second intake valve. In such an embodiment, exemplary calibration tables may be referenced to select a first intake valve timing for control of one intake valve based upon desired operation, for example, a desired residual gas level, and then a delayed intake valve timing may be determined based upon the first intake valve timing and the methods described herein for control of another intake valve.

Figure 7:
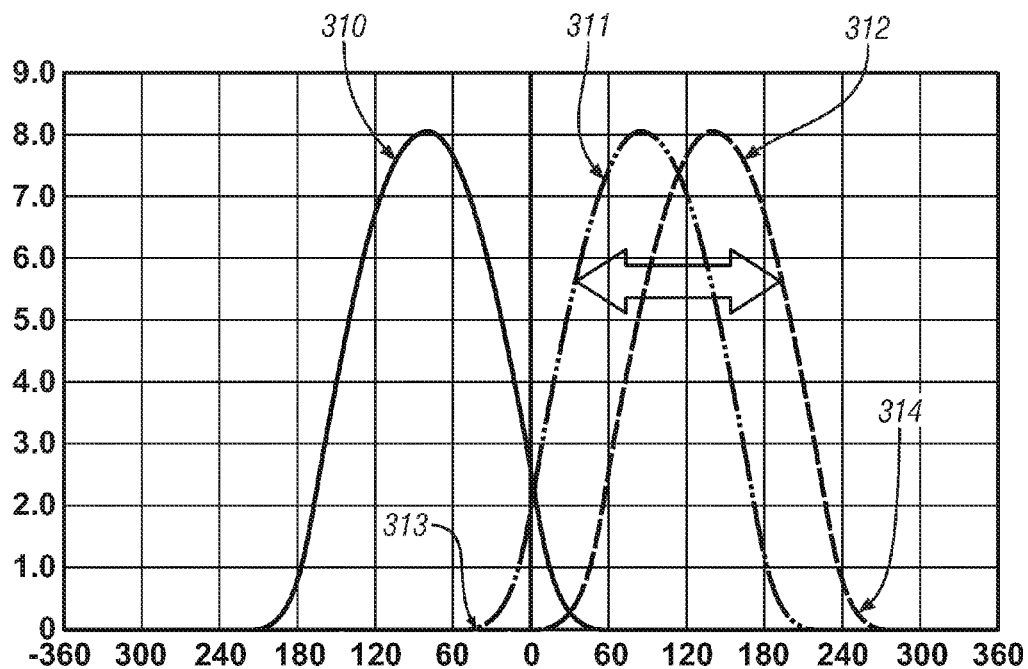
FIG. 7 depicts operation of exemplary exhaust and independently controllable intake valves, in accordance with the present disclosure.

A method for improving performance of a turbocharged engine includes utilizing independently controllable intake valves, modulating the effective compression ratio based upon operation of the engine while maintaining control of residual gas levels in the cylinder. FIG. 7 depicts operation of exemplary exhaust and independently controllable intake valves, in accordance with the present disclosure. The x-axis describes crank angle degrees and the y-axis describes valve lift in mm. The opening of an exhaust valve or valves is depicted by plot 310. Additionally, the opening of two different intake valves is depicted by plots 311 and 312. Approximately centered upon the zero crank angle degree indication, the exhaust valves and one of the intake valves are open simultaneously, where zero crank angle degrees depicts the top-dead-center position. This period depicts the valve overlap described above, through which residual gas levels in the cylinder may be controlled. It will be appreciated that control of region 313 of plot 311 may be used to control residual gas in the combustion chamber. The other intake valve is retarded such that a substantial portion of the valve open period is after 180 crank angle degrees in region 314 of plot 312. The 180 crank angle degree mark represents bottom dead center. As described above, maintaining an intake valve open past bottom dead center allows a portion of the charge gas in the cylinder to be expelled back into the intake manifold, thereby allowing control of the effective compression ratio. In this way, control of both residual gas levels and effective compression ratio may be achieved.

As described in relation to FIG. 7, one of the independently controllable intake valves may be utilized to achieve a valve overlap. It will be appreciated that utilizing one of the valves to achieve a desired residual gas level may require a different valve timing than would be required if both valves were included in the valve overlap and/or a different intake manifold pressure level is achieved. Such an adjustment to the single valve timing achieving valve overlap may be accomplished according to calibration or modeling methods known in the art.

Based upon engine operation, independent control of the intake-valve-closing timings may be commanded. As described above, one of the independently controllable intake valves may be controlled according to known engine calibration methods, for example, according to a desired residual gas level. Methods to control the other intake valve, for example, controlling the compression ratio of the engine according to a desired effective compression ratio, may take a number of embodiments. A number of methods to estimate a desired effective compression ratio or to monitor factors indicative of a desired effective compression ratio may be described. A first exemplary control method includes modeling a desired effective compression ratio. Such a model may include calibrations, formulas or other modeling techniques according to any method to accurately predict engine operation, and a multitude of model formulations might be used by the same engine for each cylinder and for different engine settings, conditions, or operating ranges. Another exemplary control method includes controlling the intake valve timing according to a load of the engine. As described above, an engine operating at a lower load may frequently utilize a higher compression ratio than the same engine operating at a higher load. A number of methods to estimate load of an engine are known in the art, monitoring inputs describing engine state such as fuel flow to the engine, throttle, or accelerator pedal position.

Another exemplary control method includes using the knock sensor and open-loop calibrated spark timing information to control valve timing related to a desired effective compression ratio. This control method may determine a difference between an actual spark event, for example, as determined by the knock sensor, and the open-loop calibrated spark timing. Such a spark difference or comparison may be used in combination with other parameters, such as an in-cylinder temperature, air-fuel ratio, and pressure conditions provided by an engine model to describe a desired effective compression ratio. In another embodiment, a monitored knock sensor may be combined with a model describing in-cylinder conditions for example, including a spark timing comparison combined with a model describing air fuel charge contents within the cylinder. Similarly, a base CA50 may be compared to a determined CA50 based upon in-cylinder pressure measurements to determine in-cylinder conditions. According to one exemplary control embodiment, when the actual spark event is retarded compared to the production calibration, the intake-valve-closing timing may be delayed to reduce the effective compression ratio while the boost pressure may be increased to achieve the engine load requirement. According to another exemplary control embodiment, when the actual spark event is advanced compared to the calibrated values, the intake-valve closing timing may be advanced and the boost pressure may be reduced to allow the engine to operate at a higher efficiency level while maintaining required performance.

Another exemplary control method includes using the knock sensor and pressure sensor information to control valve timing related to a desired effective compression ratio. Pressure sensor information may be utilized to describe various factors within the cylinder, for example, describing heat release rates or CA50 parameters describing combustion within the cylinder. Such pressure sensor information may be used to describe a desired effective compression ratio based upon calibrations and relationships known in the art.

Another exemplary control method includes using fuel quality information to control valve timing related to a desired effective compression ratio. As described above, a cylinder utilizing higher octane fuels and alternative fuels may operate with a higher compression ratio than can the same cylinder with a lower octane fuel. Such a control modification corresponding to a desired effective compression ratio for a measured fuel quality may be developed experimentally, empirically, predictively, through modeling or other techniques adequate to accurately predict engine operation, and a multitude of fuel quality calibration curves might be used by the same engine for each cylinder and for different engine settings, conditions, or operating ranges. For example, when the fuel tank sensor indicates low octane gasoline is being used, the intake-valve-closing timing may be delayed and boost pressure increased to achieve the designed engine load while managing acceptable engine knock and pre-ignition performance. When the fuel-tank sensor detects higher octane fuel, such as E85, the intake-valve-closing timing is advanced and the boost pressure reduced allowing the engine to operate with higher efficiency at the designed higher geometric compression ratio. Such a control modification related to fuel quality may be operated independently. In the alternative, such a control modification may be operated in combination with another method described herein, for example, in combination with a method utilizing a knock sensor and a spark comparison to estimate a desired effective compression ratio based upon engine operation. In this way, an intake valve timing may be adjusted for both engine operation, allowing modulation of effective compression ratio for different engine loads, and for fuel quality.

In addition to controlling intake valve timing, methods described herein may be utilized to control other combustion parameters. As described above, retarding the closing of the intake valve past bottom dead center requires that boost pressure be controlled in order to maintain a desired intake manifold pressure. Such control of boost pressure may be effected in correlation to control of the intake valve timing or the desired effective compression ratio. Such a correlation may be developed experimentally, empirically, predictively, through modeling or other techniques adequate to accurately predict engine operation and the effect of boost pressure upon engine operation. Additionally, the methods described herein may be utilized to simultaneously control other related engine parameters, for example, including an exhaust-cam lift or position, an intake-cam life or position, an air-fuel ratio, a fuel injection strategy and timing, a fuel pressure, and any other more typical engine calibration parameters. Other engine calibration parameters may simultaneously be adjusted based on more typical calibration tables.

It will be noted in the above exemplary embodiments that increased boost may be required to compensate for required engine load. In some configurations, the existing boost capacity of an existing turbocharger may be sufficient to provide the required boost. In other configurations, a supercharger or a twin-turbo configuration may be utilized to provide additional required boost. For example, in conditions of low engine speed, wherein boost available through a single turbocharger is low, and high load, wherein a large splay is required according to the methods described herein while a large mass of air is required to support the high load combustion event, additional boost air may be required to adequately support combustion at the desired effective compression ratio. Boost requirements and capacity of a turbocharger to provide boost under a range of conditions may be measured, estimated, or modeled according to methods known in the art.

The above methods describe control of different parameters within a turbocharged engine, including control of a compression ratio and boost pressures, to enable balancing between fuel efficiency and issues of knock and pre-ignition that occur at higher engine loads. It will be appreciated that the control methods provided herein may further be utilized to control knock and pre-ignition control characteristics throughout the range of operation of the engine. Further, it will be appreciated that the control methods further enable control of lower peak combustion pressures. Further, as described above, use of high compression ratios at part-load or non-WOT conditions may improve fuel economy of the engine. It will be appreciated that fuel economy may be further improved by enabling different combustion strategies or modes, such as HCCI, stratified charge combustion, or PCCI.

The above methods describe open-loop and closed-loop control methods. Methods utilizing the fuel quality sensor work in an open-loop control. The fuel quality is detected and adjustments to the calibration tables are made, for example, utilizing a correct calibration table. Intake-air temperature may also be used as an open-loop indicator of the calibration. An exemplary closed-loop control method utilizes data from the knock sensor to continuously monitor knock and relative spark advance.

Figure 8:
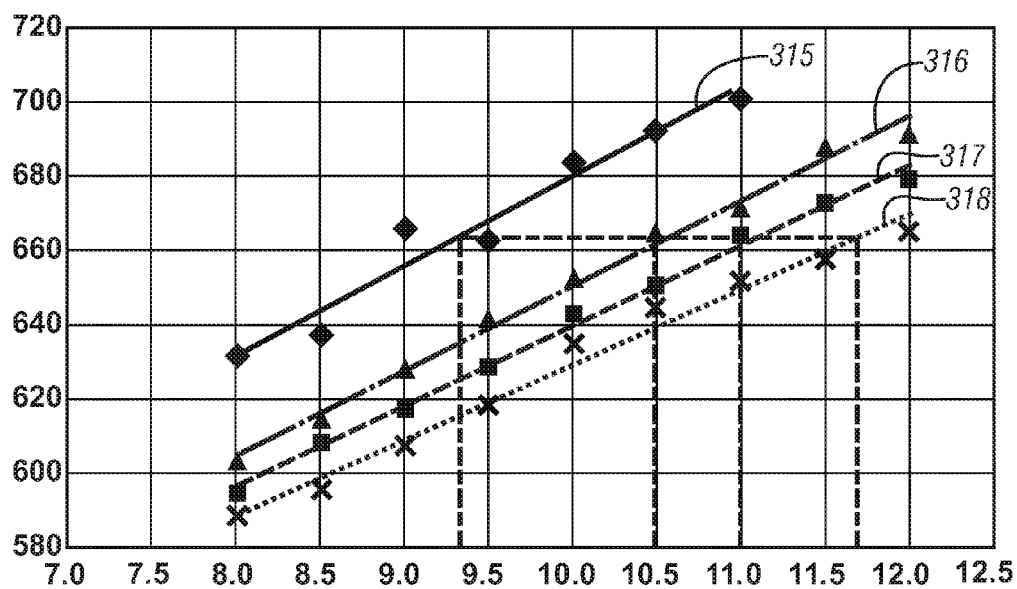
FIG. 8 depicts exemplary engine operation with varying geometric compression ratios, in accordance with the present disclosure.

FIG. 8 depicts exemplary engine operation with varying effective compression ratios, in accordance with the present disclosure. The x-axis describes a compression ratio, and the y-axis represents a combustion chamber temperature at TDC in Kelvin (K). As described above, peak combustion temperatures may be used as an indicator of limits of an engine to operate without incurring knock and other combustion issues or to operate within acceptable combustion limitations. In the present illustration, a maximum peak combustion temperature of 663 K is depicted. Four sample intake valve configurations are depicted. A baseline sample is depicted by plot 315, where geometric compression ratio is varied through a range of values and both intake valves have the same opening and closing timings. As is evident in the data, lower compression ratios result in lower peak combustion temperatures. Higher compression ratios result in higher peak combustion temperatures, resulting in violation of the maximum peak combustion temperature. The remaining data plots depict use of splayed intake valve timings of 70 degrees (plot 316), 80 degrees (plot 317), and 90 degrees (plot 318). Use of these splayed intake valve timings allows reduction of the effective compression ratios and lower peak combustion temperatures. As a result, higher geometric combustion ratios may be utilized while maintaining the peak combustion temperature below the maximum peak combustion temperature and high load combustion performance may be improved.

Figure 9:
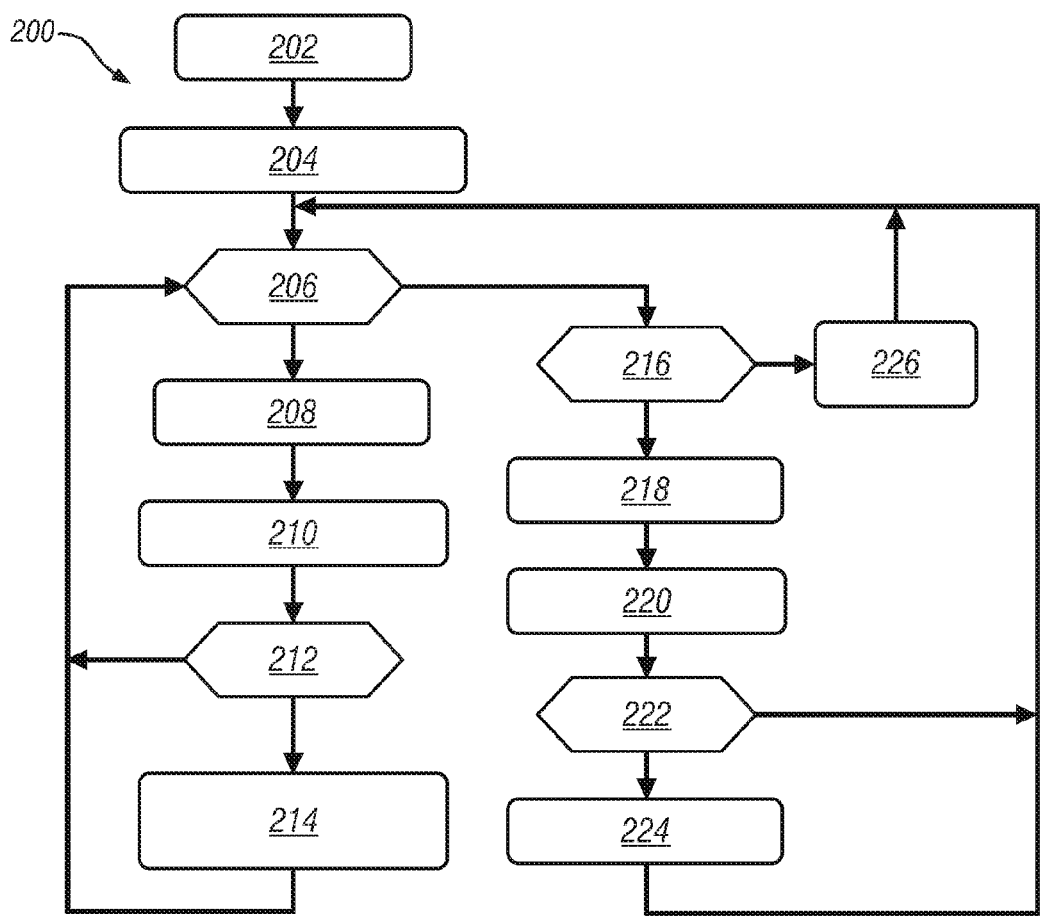
FIG. 9 depicts an exemplary process to control the methods described herein, in accordance with the present disclosure.

FIG. 9 depicts an exemplary process to control the methods described herein, in accordance with the present disclosure. Process 200 starts at step 202, whereat a fuel quality sensor is monitored to detect properties of the fuel in the fuel tank. Additionally, an inlet air temperature and a humidity level may be monitored. At step 204, a nominal effective compression ratio is selected based upon the detected fuel properties, inlet air temperature, and humidity level. At step 206, a knock sensor is monitored. If knock is detected, the process advances to step 208. If knock is not detected, the process advances to step 216. At step 208, operation of the engine is monitored, and operating and trapped charge mass conditions are determined or estimated. At step 210, spark offset or a comparison of actual spark to nominal spark is determined, according to methods known in the art or described herein. At step 212, a determination is made whether cam splay or the difference in timing between the cams controlling the intake valves is at a maximum setting. If cam splay is at a maximum setting, then the process returns to step 206. If the cam splay is not at a maximum setting, cam splay and boost pressure are increased according to exemplary functional relationships A1 and A2, determinable according to methods described herein and/or calibration methods known in the art. After step 214, the process returns to step 206. At step 216, a determination of whether the engine is boosted or not is made. If the engine is presently boosted, then the process advances to step 218. If the engine is not presently boosted, then the process advances to step 226 whereat the base engine calibration strategy is implemented, and the process then returns to step 206. At step 218, operation of the engine is monitored, and operating and trapped charge mass conditions are determined or estimated. At step 220, a nominal intake valve splay position and splay offset, describing a difference in timing between the intake valves, is determined. At step 222, a determination is made whether cam splay is at a minimum setting. If the cam splay is at a minimum setting, the process returns to step 206. If the cam splay is not at the minimum setting, the process advances to step 224, whereat the cam splay settings are decreased according to exemplary function B, determinable according to methods described herein and/or calibration methods known in the art.

Figure 10:
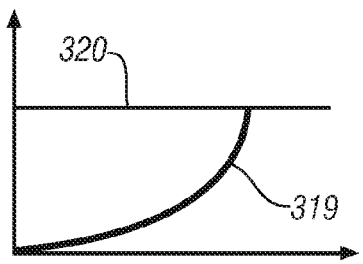
FIGS. 10-12 depict exemplary functions A1, A2, and B described in relation to the process of FIG. 9, in accordance with the present disclosure.
Figure 11:
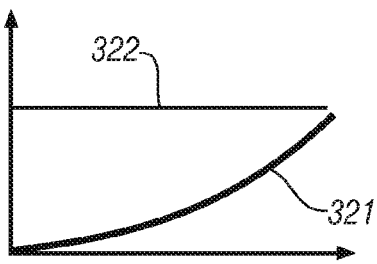
Figure 12:
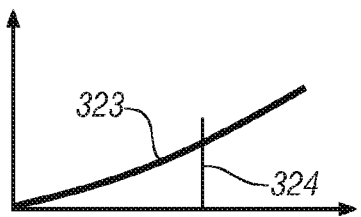

FIGS. 10-12 depict exemplary functions A1, A2, and B described in relation to the process of FIG. 9, in accordance with the present disclosure. The depicted functions are exemplary in nature for a particular engine configuration, and such relationships for other engine configurations may be determined and reduced to functional expressions according to methods known in the art. Plot 319 of FIG. 10 depicts an exemplary relationship between a spark offset as described in FIG. 9, step 210, and a delta cam splay or a desired change in cam splay for a determined spark offset, described as Function A1. The x-axis describes spark offset and the y-axis describes delta cam splay. The horizontal line 320 depicts a maximum splay offset. The maximum splay offset describes the maximum change in cam splay that is allowed. Plot 321 of FIG. 11 depicts an exemplary relationship between cam splay and boost pressure, described as Function A2. The x-axis describes spark offset and the y-axis describes boost pressure. The horizontal line 322 depicts a maximum boost pressure. As described above, as cam splay is increased and the volume of air trapped and compressed is decreased, increased boost air or increased air pressure within the cylinder is required to deliver a required mass of air for the combustion event. According to FIG. 11, a boost pressure may be determined based upon a known cam splay. The maximum boost pressure describes a limit of the engine configuration to deliver boost air to the cylinder. Plot 323 of FIG. 12 depicts an exemplary relationship between calculated splay offset, as described in FIG. 9, step 220, and boost pressure, described as Function B. The x-axis describes boost ratio and the y-axis describes delta cam splay. The vertical line 324 depicts a nominal splay. Such a relationship may be utilized to adjust boost pressure based upon a calculated splay offset for a non-nominal cam splay.

Figure 13:
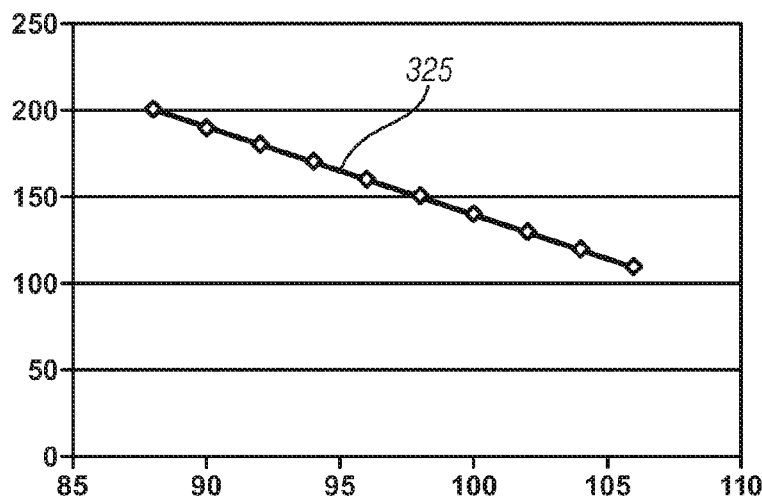
FIGS. 13-15 depict exemplary relationships that may be utilized to control an open-loop control based upon a detected fuel type and quality, in accordance with the present disclosure.
Figure 14:
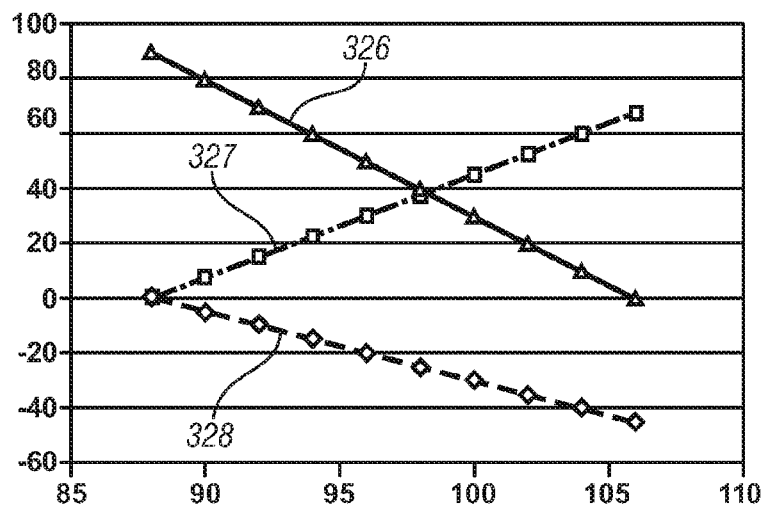
Figure 15:
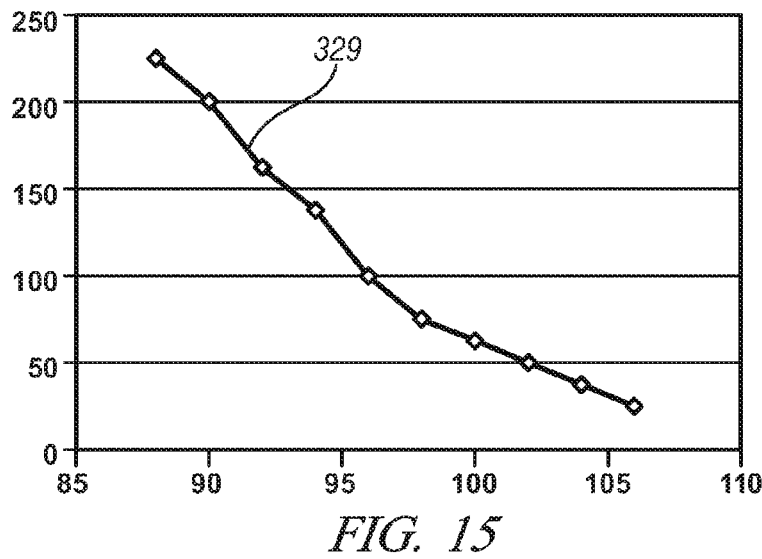

FIGS. 13-15 depict exemplary relationships that may be utilized to control an open-loop control based upon a detected fuel type and quality, in accordance with the present disclosure. FIGS. 13-15 depict exemplary results of a particular engine configuration, and similar results may be developed for another engine configuration based upon methods known in the art. Plot 325 in FIG. 13 depicts a boost pressure calibration that may be implemented based upon monitored fuel type and quality. The x-axis describes fuel type and quality, a unit-less measure describing an octane, a type of fuel, combustion performance of the fuel, and other commonly known measures of combustion properties for a fuel, and the y-axis describes boost pressure in kPa. As the fuel type and quality increases, as described above, a higher effective compression ratio may be utilized requiring a lower boost pressure. FIG. 14 depicts valve phasing calibrations that may be made based upon monitored fuel type and quality. The x-axis describes fuel type and quality, and the y-axis describes valve phasing in CAD. Cam splay (plot 326), exhaust phasing (327), and intake phasing (328) are depicted, each describing exemplary calibrations that may be made based upon the monitored fuel type and quality. Plot 329 in FIG. 15 depicts spark advance calibration that may be made based upon monitored fuel type and quality. The x-axis describes fuel type and quality, and the y-axis describes spark advance in CAD after TDC. Similar calibrations may be determined and utilized based upon monitored fuel type and quality, including fuel injection timing, fuel pressure, fuel injection strategy (number of injections and mass in each injection event), engine airflow calibration, external EGR, and equivalent ratio. The depicted data may be dependent upon engine speed and load. The depicted functional relationships may be modified based upon engine speed and load or different functional relationships or look-up tables may be utilized based upon speed and load.

The methods described above describe controlling intake valve cam splay based upon monitored conditions within a system utilizing a plurality of independently controllable intake valves. Such methods may be described as monitoring an unmodified timing for the plurality of independently controllable intake valves for the cylinder. Such an unmodified timing may describe nominal valve settings determined according to known means, for example, determining a desired residual gas content in the combustion chamber. The method further includes monitoring operation of the engine. According to the methods described above, such monitoring may include such parameters as a knock sensor, combustion pressure sensors, fuel type and quality sensors, and other parameters described herein. The method further includes determining a delay timing for a first intake valve of the independently controllable intake valves for the cylinder based upon the monitored operation of the engine and the unmodified timing for the plurality of independently controllable intake valves for the cylinder. The method further includes controlling the first intake valve based upon the determined delay timing for the first intake valve and controlling a second intake valve of the independently controllable intake valves for the cylinder based upon the monitored unmodified timing.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to operate a charged internal combustion engine comprising a cylinder and a plurality of independently controllable intake valves for the cylinder, the method comprising:
   monitoring an unmodified timing for the plurality of independently controllable intake valves for the cylinder;
   monitoring operation of the engine;
   determining a delay closing timing for a first intake valve of the independently controllable intake valves for the cylinder to remain open at an end of an intake stroke past bottom dead center to achieve a desired effective compression ratio based upon the monitored operation of the engine and the unmodified timing for the plurality of independently controllable intake valves for the cylinder;
   controlling the first intake valve based upon the determined delay timing for the first intake valve; and
   controlling a second intake valve of the independently controllable intake valves for the cylinder based upon the monitored unmodified timing.

2. The method of claim 1, wherein monitoring the unmodified timing for the plurality of independently controllable intake valves for the cylinder comprises:
   monitoring a desired residual gas level of the cylinder; and
   determining the unmodified timing for the plurality of independently controllable intake valves for the cylinder based upon the desired residual gas level of the cylinder.

3. The method of claim 1, wherein monitoring the unmodified timing for the plurality of independently controllable intake valves for the cylinder comprises:
   monitoring a speed of the engine;
   monitoring a load of the engine; and
   determining the unmodified timing for the plurality of independently controllable intake valves for the cylinder based upon the speed of the engine and the load of the engine.

4. The method of claim 3, further comprising determining a timing for an exhaust valve for the cylinder based upon the speed of the engine and the load of the engine.

5. The method of claim 1, wherein the monitoring operation of the engine comprises monitoring an engine load, and wherein determining the delay timing for the first intake valve of the independently controllable intake valves for the cylinder based upon the monitored operation of the engine comprises determining the delay timing for the first intake valve based upon the monitored engine load.

6. The method of claim 1, wherein the monitoring operation of the engine comprises monitoring a desired effective compression ratio, and wherein determining the delay timing for the first intake valve of the independently controllable intake valves for the cylinder based upon the monitored operation of the engine comprises determining the delay timing for the first intake valve based upon the desired effective compression ratio.

7. The method of claim 1, wherein the cylinder is configured with a geometric compression ratio based upon fuel efficiency;
   wherein the monitoring operation of the engine comprises monitoring a engine throttle level; and
   wherein determining the delay timing for the first intake valve of the independently controllable intake valves for the cylinder based upon the monitored operation of the engine comprises determining the delay timing for the first intake valve based upon the monitored engine throttle level approaching wide open throttle.

8. The method of claim 1, wherein monitoring operation of the engine comprises:
monitoring a knock sensor;
monitoring an actual spark timing;
monitoring an open-loop spark timing; and
comparing the actual spark timing and the open-loop spark timing; and
wherein determining the delay timing for the first intake valve comprises a closed-loop determination of the delay timing based upon the monitored knock sensor and the comparison of the actual spark timing and the open-loop spark timing.

9. The method of claim 8, further comprising:
determining an exhaust-cam position based upon the monitored operation of the engine;
determining an intake-cam position based upon the monitored operation of the engine;
determining a boost pressure based upon the monitored operation of the engine;
determining an air fuel ratio based upon the monitored operation of the engine;
determining a fuel injection strategy and timing based upon the monitored operation of the engine;
determining a fuel pressure based upon the monitored operation of the engine; and
determining a nominal spark timing based upon the monitored operation of the engine.

10. The method of claim 1, wherein monitoring operation of the engine comprises monitoring a fuel quality sensor;
wherein determining the delay timing for the first intake valve comprises an open-loop determination of the delay timing based upon the monitored fuel quality sensor; and
the method further comprising determining a boost pressure calibration based upon the monitored fuel quality sensor in an open-loop determination.

11. The method of claim 1, wherein monitoring operation of the engine comprises:
monitoring a knock sensor; and
monitoring modeled in-cylinder conditions;
wherein determining the delay timing for the first intake valve comprises a closed-loop determination of the delay timing based upon the monitored knock sensor and the monitored modeled in-cylinder conditions; and
the method further comprising determining a boost pressure based upon the monitored knock sensor and the monitored modeled in-cylinder conditions in a closed-loop determination.

12. The method of claim 11, wherein monitoring modeled in-cylinder conditions comprises:
monitoring an actual spark timing;
monitoring an open-loop spark timing;
comparing the actual spark timing and the open-loop spark timing; and
monitoring a model of charge contents within the cylinder.

13. The method of claim 11, wherein monitoring modeled in-cylinder conditions comprises:
monitoring base CA50 value;
monitoring an in-cylinder pressure;
determining a CA50 value based upon the in-cylinder pressure; and
comparing the determined CA50 value to the base CA50 value.

14. The method of claim 1, wherein monitoring operation of the engine comprises:

monitoring a knock sensor; and
monitoring in-cylinder pressure;
wherein determining the delay timing for the first intake valve comprises a closed-loop determination of the delay timing based upon the monitored knock sensor and the monitored in-cylinder pressure; and
further comprising determining a boost pressure based upon the monitored knock sensor and the monitored in-cylinder pressure in a closed-loop determination.

15. The method of claim 1, wherein monitoring operation of the engine comprises:
monitoring an actual spark timing;
monitoring an open-loop spark timing;
comparing the actual spark timing and the open-loop spark timing; and
monitoring a fuel quality sensor;
wherein determining the delay timing for the first intake valve comprises
a closed-loop determination of the delay timing based upon the monitored knock sensor and the comparison of the actual spark timing and the open-loop spark timing, and
an open-loop determination of the delay timing based upon the monitored fuel quality sensor.

16. System for operating a charged internal combustion engine comprising a cylinder and a plurality of independently controllable intake valves for the cylinder, the system comprising:
the cylinder;
the plurality of independently controllable intake valves for the cylinder;
a control module
monitoring a first timing for the plurality of independently controllable intake valves for the cylinder,
monitoring operation of the engine,
determining a delay closing timing for a first intake valve of the independently controllable intake valves for the cylinder to remain open at an end of an intake stroke past bottom dead center to achieve a desired effective compression ratio based upon the monitored operation of the engine,
controlling the first intake valve based upon the determined delay closing timing for the first intake valve, and
controlling a second intake valve of the independently controllable intake valves for the cylinder based upon the monitored first timing; and
wherein the delay closing timing for the first intake valve of the independently controllable intake valves is selected to lower an effective compression ratio in the cylinder to achieve the desired effective compression ratio in the cylinder.

17. The system of claim 16, wherein the first timing for the plurality of independently controllable intake valves is selected based upon a desired residual gas level in the cylinder.

18. The system of claim 17, further comprising a controllable exhaust valve for the cylinder; and
wherein the control module further controls the controllable exhaust valve for the cylinder based upon the desired residual gas level in the cylinder.

19. The system of claim 16, further comprising a charging device; and
wherein the control module further controls a boost pressure from the charging device based upon the monitored operation of the engine.

20. The system of claim 16, further comprising a fuel quality sensor; and
  wherein the control module monitoring operation of the engine comprises the control module monitoring the fuel quality sensor; and
  wherein the control module determining the delay timing for the first intake valve based upon the monitored operation of the engine comprises the control module determining the delay timing for the first intake valve based upon the monitored fuel quality sensor.

21. The system of claim 16, further comprising:
  an independently controllable cam controlling each of the independently controllable intake valves.

\* \* \* \* \*